United States Patent
Peng

(10) Patent No.: US 12,495,479 B2
(45) Date of Patent: Dec. 9, 2025

(54) LIGHT-EMITTING DIODE CIRCUIT WITH PARALLEL SEQUENCE FUNCTION, LIGHT-EMITTING DIODE CIRCUIT PACKAGE, AND LIGHT-EMITTING DIODE LIGHT STRING

(71) Applicant: SEMISILICON TECHNOLOGY CORP., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 114 days.

(21) Appl. No.: 18/610,608

(22) Filed: Mar. 20, 2024

(65) Prior Publication Data

US 2025/0301552 A1    Sep. 25, 2025

(51) Int. Cl.
*H05B 47/165* (2020.01)
*H05B 45/34* (2020.01)
*H05B 45/3725* (2020.01)

(52) U.S. Cl.
CPC .......... *H05B 47/165* (2020.01); *H05B 45/34* (2020.01); *H05B 45/3725* (2020.01)

(58) Field of Classification Search
CPC ... H05B 47/165; H05B 45/34; H05B 45/3725
See application file for complete search history.

(56) References Cited

U.S. PATENT DOCUMENTS

| | | | | |
|---|---|---|---|---|
| 10,470,279 | B1* | 11/2019 | Fultz | H05B 45/30 |
| 2011/0285319 | A1* | 11/2011 | Chao | H05B 45/395 |
| | | | | 315/297 |
| 2013/0063035 | A1* | 3/2013 | Baddela | H05B 45/3577 |
| | | | | 315/192 |
| 2017/0318631 | A1 | 11/2017 | Zhao | |

FOREIGN PATENT DOCUMENTS

| TW | 202042593 A | 11/2020 |
|---|---|---|
| TW | 1767698 B | 6/2022 |

OTHER PUBLICATIONS

Office Action dated Dec. 19, 2024 of the corresponding Taiwan patent application No. 113106849.

* cited by examiner

*Primary Examiner* — Daniel D Chang
(74) *Attorney, Agent, or Firm* — Muncy, Geissler, Olds & Lowe, P.C.

(57) ABSTRACT

A LED circuit includes an inner resistor, an ADC circuit, a drive circuit, and a current source. The inner resistor has a first terminal and a second terminal, the first terminal is connected to an input terminal of a power wire, and the second terminal is connected to the output terminal of the power wire. The input terminal is coupled to a controller, and receives a voltage signal generated by the controller, and an inner voltage is provided at the first terminal or the second terminal of the inner resistor. The ADC circuit receives the inner voltage. The drive circuit externally receives the voltage signal through the power wire. When the drive circuit performs a sequence mode according to a specific signal, the ADC circuit performs an analog-to-digital conversion to the inner voltage to generate a digital sequence number, and the drive circuit stores the digital sequence number.

18 Claims, 4 Drawing Sheets

LIGHT-EMITTING DIODE CIRCUIT WITH PARALLEL SEQUENCE FUNCTION, LIGHT-EMITTING DIODE CIRCUIT PACKAGE, AND LIGHT-EMITTING DIODE LIGHT STRING

BACKGROUND

Technical Field

The present disclosure relates to a LED circuit, a LED circuit package, and a LED light string, and more particularly to a LED circuit with parallel sequence function, a LED circuit package, and a LED light string.

Description of Related Art

The statements in this section merely provide background information related to the present disclosure and do not necessarily constitute prior art.

Since light-emitting diode (LED) has the advantages of high luminous efficiency, low power consumption, long life span, fast response, high reliability, etc., LEDs have been widely used in lighting fixtures or decorative lighting, such as Christmas tree lighting, lighting effects of sport shoes, etc. by connecting light bars or light strings in series, parallel, or series-parallel.

Take the festive light for example. Basically, a complete LED lamp includes an LED light string having a plurality of LEDs and a drive unit for driving the LEDs. The drive unit is electrically connected to the LED light string, and controls the LEDs by a pixel control manner or a synchronous manner by providing the required power and the control signal having light data to the LEDs, thereby implementing various lighting output effects and changes of the LED lamp.

According to the present technology, in order to drive the LEDs of the LED light string to diversify light emission, the LEDs have different address sequence data. The LEDs receive light signals including light data and address data. If the address sequence data of the LEDs are the same as the address data of the light signals, the LEDs emit light according to the light data of the light signals. If the address sequence data of the LEDs are not the same as the address data of the light signals, the LEDs ignore the light data of the light signals.

At present, most of the LED sequence methods of the LED light string are complicated and/or difficult. For example, before the LEDs are combined into an LED light string, it is necessary to burn different address sequence data for each LED. Afterward, the LEDs are sequentially arranged and combined into the LED light string according to the address sequence data. If the LEDs are not arranged in sequence according to the address sequence data, the diversified light emission of the LEDs cannot be correctly achieved.

Furthermore, when current LED light strings adopt low-voltage (such as 5 volts) DC carrier parallel light strings, in order to achieve carrier control, each LED light on the light string needs to be sequenced first so as to facilitate subsequent carrier control to drive the lighting mode. However, since the current of low-voltage LED light strings is easily affected by disturbances, if the current is unstable, the voltage signal will become unstable, and the control IC in the LED light will not be able to accurately identify the signal.

Therefore, how to design a LED light string, and more particularly to a LED circuit with parallel sequence function, a LED circuit package, and a LED light string to solve the problems and technical bottlenecks in the existing technology has become a critical topic in this field.

SUMMARY

An objective of the present disclosure is to provide a light-emitting diode circuit with a parallel sequence function. The light-emitting diode circuit includes an inner resistor, an analog-to-digital conversion circuit, a drive circuit, and a current source. The inner resistor includes a first terminal and a second terminal, the first terminal is connected to an input terminal of a power wire, and the second terminal is connected to an output terminal of the power wire. The input terminal is coupled to a controller, and receives a voltage signal generated by the controller. An inner voltage is provided at the first terminal or the second terminal of the inner resistor. The analog-to-digital conversion circuit is coupled to the power wire, and receives the inner voltage. The drive circuit is coupled to the power wire and the analog-to-digital conversion circuit, and the drive circuit externally receives the voltage signal. The current source is coupled to the drive circuit and the analog-to-digital conversion circuit, and the current source provides a current path of the light-emitting diode circuit. When the drive circuit performs a sequence mode according to a specific signal, the analog-to-digital conversion circuit performs an analog-to-digital conversion to the inner voltage to generate a digital sequence number, and then the drive circuit stores the digital sequence number.

In one embodiment, after the sequence mode is completed, the drive circuit is performing a working mode. The drive circuit externally receives a light-emitting command including a sequence number information and a lighting information generated by the controller through the power wire. When the drive circuit determines that the digital sequence number matches with the sequence number information, the drive circuit controls a specific lighting behavior of a light-emitting diode corresponding to the drive circuit according to the lighting information.

In one embodiment, the light-emitting diode circuit further includes a voltage regulation circuit. The voltage regulation circuit is coupled to the power wire, and receives the inner voltage and converts the inner voltage into a supply voltage with a specific voltage value for operating the analog-to-digital conversion circuit.

In one embodiment, the voltage signal is a direct-current voltage, a pulse voltage, or a carrier voltage.

In one embodiment, the sequence number information and the lighting information are respectively digital values with a plurality of bits.

In one embodiment, the lighting information is continued with the sequence number information to form the light-emitting command, or the sequence number information is continued with the lighting information to form the light-emitting command.

In one embodiment, the inner voltage is provided for an operation of the drive circuit.

In one embodiment, the controller is configured to generate the specific signal, and the specific signal is received by the power wire; the specific signal is a specific code.

Another objective of the present disclosure is to provide a light-emitting diode circuit package with a parallel sequence function. The light-emitting diode circuit package includes two power pins, at least one light-emitting diode, a light-emitting diode circuit, and a package. The two power pins receive a voltage signal. The at least one light-emitting diode is coupled to the two power pins. The light-emitting diode circuit is coupled to the two power pins and the at least one light-emitting diode, and the light-emitting diode circuit is supplied power by the voltage signal. The light-emitting diode circuit includes an analog-to-digital conversion circuit and a drive circuit. The drive circuit is coupled to the analog-to-digital conversion circuit. When the drive circuit performs a sequence mode according to a specific signal, the analog-to-digital conversion circuit performs an analog-to-digital conversion to an inner voltage to generate a digital sequence number, and then the drive circuit stores the digital sequence number. The package packages the light-emitting diode circuit, the at least one light-emitting diode, and a part of the two power pins, wherein each power pin is partially exposed outside the package.

Further another objective of the present disclosure is to provide a light-emitting diode light string with a parallel sequence function. The light-emitting diode light string includes a plurality of light-emitting diode circuits. The plurality of light-emitting diode circuits is electrically connected to form a parallel-connected structure through a power wire. Each light-emitting diode circuit includes an inner resistor, an analog-to-digital conversion circuit, a drive circuit, and a current source. The inner resistor includes a first terminal and a second terminal. The first terminal is connected to an input terminal of the power wire, and the second terminal connected to an output terminal of the power wire. The input terminal of a first light-emitting diode circuit of the plurality of light-emitting diode circuits is coupled to a controller, and receives a voltage signal generated by the controller. An inner voltage is provided at the first terminal or the second terminal of the inner resistor. The input terminal of non-first light-emitting diode circuits of the plurality of light-emitting diode circuits receives the inner voltage provided the previous light-emitting diode circuit or receives a voltage acquired after the inner voltage provided by the previous light-emitting diode circuit minus a voltage across the inner resistor. The analog-to-digital conversion circuit is coupled to the power wire, and receives the inner voltage. The drive circuit is coupled to the power wire and the analog-to-digital conversion circuit, and the drive circuit externally receives the voltage signal. The current source is coupled to the drive circuit and the analog-to-digital conversion circuit, and the current source provides a current path of the light-emitting diode circuit. The inner resistors of the light-emitting diode circuits are connected in series through the power wire. When each of the drive circuits performs a sequence mode according to a specific signal, each of the analog-to-digital conversion circuits performs an analog-to-digital conversion to the inner voltage to generate a digital sequence number, and then each of the drive circuits stores the digital sequence number.

In one embodiment, after the sequence mode is completed, each of the drive circuits performs a working mode. Each of the drive circuits externally receives a light-emitting command comprising a sequence number information and a lighting information generated by the controller through the power wire. When each of the drive circuits determines that the digital sequence number matches with the sequence number information, each of the drive circuits controls a specific lighting behavior of a light-emitting diode corresponding to the drive circuit according to the lighting information.

In one embodiment, each of the light-emitting diode circuits further includes a voltage regulation circuit. The voltage regulation circuit is coupled to the power wire, and receives the inner voltage and convert the inner voltage into a supply voltage with a specific voltage value for operating the analog-to-digital conversion circuit.

In one embodiment, the voltage signal is a direct-current voltage, a pulse voltage, or a carrier voltage.

In one embodiment, the sequence number information and the lighting information are respectively digital values with a plurality of bits.

In one embodiment, the lighting information is continued with the sequence number information to form the light-emitting command, or the sequence number information is continued with the lighting information to form the light-emitting command.

In one embodiment, the inner voltage is provided for an operation of the drive circuit.

In one embodiment, the controller is configured to generate the specific signal, and the specific signal is received by the power wire; the specific signal is a specific code.

In one embodiment, the inner voltage of the light-emitting diode circuit whose electrical connection position is close to the input terminal is greater than the inner voltage of the light-emitting diode circuit whose electrical connection position is far from the input terminal.

Accordingly, the present disclosure has the following features and advantages: 1. the LED light string of the present disclosure does not require the use of additional external resistors, switches or constant current circuits or devices, thereby making the light string structure simple and simplifying circuit design; 2. the LED circuit of the present disclosure arranges the inner resistor and the current source in the control IC so that the LED light string structure is simple and easy to assemble, produce and use; 3. the present disclosure adopts a parallel carrier design, which eliminates the need for additional wires to design signal transmission lines, and the control IC does not require additional contacts to receive specific voltage signals, thereby making the control simple and intuitive.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1A:
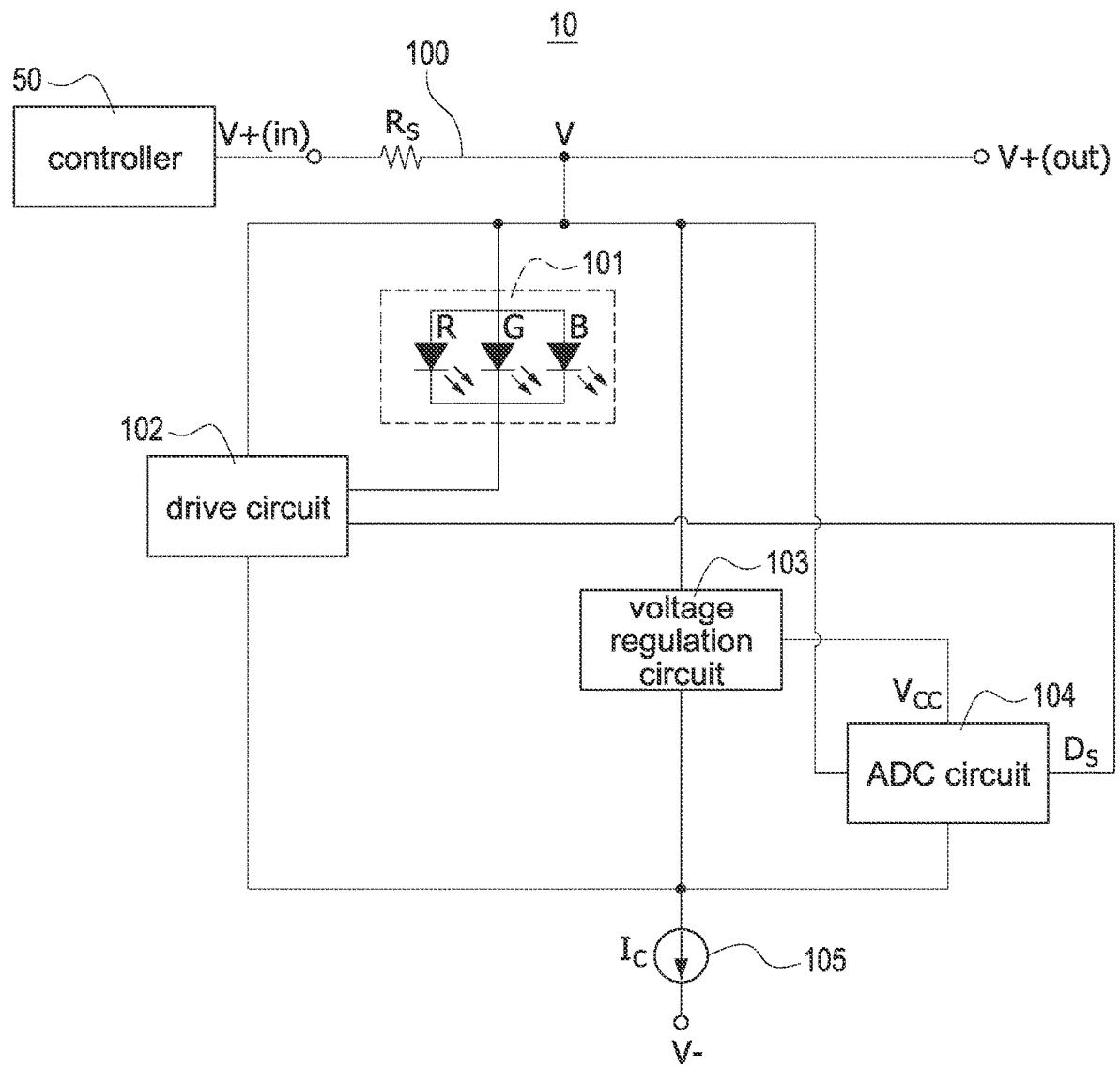
FIG. 1A is a block circuit diagram of a light-emitting diode (LED) circuit with a parallel sequence function according to a first embodiment of the present disclosure.

Reference will now be made to the drawing figures to describe the present disclosure in detail. It will be understood that the drawing figures and exemplified embodiments of present disclosure are not limited to the details thereof.

The implementation of the present disclosure is described below through specific examples, and those who are familiar with this technology can easily understand other advantages and effects of the present disclosure from the content disclosed in this specification. The present disclosure can also be implemented or applied through other different specific examples, and the details in the present disclosure can also be modified and changed based on different viewpoints and applications without departing from the spirit of the present disclosure.

The structures, proportions, sizes, and number of components shown in the drawings attached to the present disclosure are only used to match the content in the present disclosure, for those who are familiar with this technology to understand and read, and are not used to limit the implementation of the present disclosure. Any modification of structure, change of proportional relationship or adjustment of size shall fall within the scope covered by the technical content disclosed in the present disclosure, provided that it does not affect the effect and purpose of the present disclosure.

Please refer to FIG. 1A, which shows a block circuit diagram of a light-emitting diode (LED) circuit with a parallel sequence function according to a first embodiment of the present disclosure. The LED circuit 10 may be in the form of an integrated circuit (IC), which means that the LED circuit 10 may be a control IC. The LED circuit with the parallel sequence function 10 (hereinafter abbreviated as "LED circuit 10") includes an inner resistor $R_S$, an analog-to-digital conversion (ADC) circuit 104, a drive circuit 102, and a current source 105.

The inner resistor $R_S$ has a first terminal and a second terminal. The first terminal is connected to an input terminal V+(in) of a power wire 100, and the second terminal is connected to an output terminal V+(out) of the power wire 100. In particular, the power wire 100 provides a power path for the LED circuit 10 to receive the voltage signal or for the plurality of LED circuits 10 to carry the inner voltages of the previous LED circuits 10, which will be described in detail later. In one embodiment, the input terminal V+(in) receives a controller 50 (i.e., an external controller), and receives a voltage signal generated by the controller 50. After a voltage drop formed by the inner resistor $R_S$ to the voltage signal, an inner voltage Vis provided at the second terminal (i.e., the output terminal V+(out)) of the inner resistor $R_S$. That is, if the voltage signal is 5 volts and the voltage drop formed by the inner resistor $R_S$ is 0.2 volts, the inner voltage V will be 4.8 volts. Incidentally, in different embodiments, the inner resistor $R_S$ may also be connected to the input terminal and the output terminal of the power wire 100 receiving a negative voltage, and the technical spirit of the present disclosure can also be implemented.

The ADC circuit 104 is coupled to the power wire 100, and receives the inner voltage V. When the drive circuit 102 performs a sequence mode, the ADC circuit 104 performs an analog-to-digital conversion to the inner voltage V to generate a digital sequence number Ds. For example, if the inner voltage Vis 4.8 volts, the ADC circuit 104 receives the analog voltage of 4.8 volts, and converts the analog voltage of 4.8 volts into a digital value of "00111110", i.e., the digital value is the digital sequence number Ds. Alternatively, if the inner voltage Vis 4.6 volts, the ADC circuit 104 receives the analog voltage of 4.6 volts, and converts the analog voltage of 4.6 volts into a digital value of "00111101", i.e., the digital value is the digital sequence number Ds. Alternatively, if the inner voltage V is 4.4 volts, the ADC circuit 104 receives the analog voltage of 4.4 volts, and converts the analog voltage of 4.4 volts into a digital value of "00111100", i.e., the digital value is the digital sequence number Ds. Therefore, the ADC circuit 104 receives the inner voltage V with different magnitudes, and correspondingly converts the inner voltage V with different magnitudes into different digital values, that is, different digital numbers Ds.

The drive circuit 102 is coupled to the power wire 100 and the ADC circuit 104, and receives the digital sequence number Ds under the sequence mode. That is, the digital sequence number Ds generated by the ADC circuit 104 is stored in the drive circuit 102. In particular, the drive circuit 102 has a self-own sequence number, and each of the plurality of drive circuits 102 of the plurality of LED circuits has its own, independent and unique self-own sequence number.

Moreover, the drive circuit 102 further externally receives a voltage signal through the input terminal V+(in). Specifically, the voltage signal is provided/generated by the controller 50, that is, the LED circuit 10 is externally coupled to the controller 50 and receives the voltage signal provided by the controller 50. The voltage signal is, for example, but not limited to, a DC voltage, such as a DC voltage between 4 volts and 12 volts, or a pulse voltage, or a carrier voltage.

Moreover, the controller 50 further provides a light-emitting command, and the light-emitting command includes a sequence number information and a lighting information. In one embodiment, the sequence number information and the lighting information are respectively digital values with a plurality of bits. For example, the sequence number information may be a digital value of "00111101", and the lighting information may be a digital value of "0010", however, this does not limit the present disclosure. In particular, the lighting information is continued with the sequence number information to form the light-emitting command, or the sequence number information is continued with the lighting information to form the light-emitting command. Take the above sequence number information with the digital value of "00111101" and the lighting information with the digital value of "0010" as an example, the lighting information is continued with the sequence number information to form the light-emitting command of "001111010010", or the sequence number information is continued with the lighting information to form the light-emitting command of "001000111101". In addition, an identification bit or character for separation may also be inserted between the two. Therefore, the light-emitting command is used to control the specific lighting behavior of the LEDs corresponding to the designated LED circuit.

For example, the light-emitting command of "001111010010" may be provided to control an intermittent flashing (corresponding to the lighting information with the digital value of "0010") of the LEDs corresponding to designated LED circuit with the digital sequence number or the self-own sequence number of "00111101". Alternatively, the light-emitting command of "001000111101" may be provided to control an intermittent flashing (corresponding to the lighting information with the digital value of "0010") of the LEDs corresponding to designated LED circuit with the digital sequence number or the self-own sequence number of "00111101".

Similarly, for example, the light-emitting command of "001100000011" may be provided to control a high-frequency flashing (corresponding to the lighting information with the digital value of "0011") of the LEDs corresponding to designated LED circuit with the digital sequence number or the self-own sequence number of "00110000". Alternatively, the light-emitting command of "001100110000" may be provided to control a high-frequency flashing (corresponding to the lighting information with the digital value of "0011") of the LEDs corresponding to designated LED circuit with the digital sequence number or the self-own sequence number of "00110000".

The current source 105 is coupled to the drive circuit 102 and the ADC circuit 104 to provide a current path of the LED circuit 10. In one embodiment, the current source 105 may be a constant current source so it can be used to maintain the LED circuit 10 to output a constant current, such as but not limited to 10 milliamps. In particular, the current source 105 may be implemented through a constant current circuit or a current mirror circuit. The drive circuit 102 receives the inner voltage V to maintain the voltage required for normal operation of the drive circuit 102 through the inner voltage V.

Therefore, the drive circuit 102 receives a specific signal generated by the controller 50 to perform a sequence mode. Specifically, the specific signal is a specific code, and the specific signal is generated by the controller 50 and is received by the power wire 100. When the drive circuit 102 receives this specific signal (i.e., the specific code) by specifically encoded, the sequence mode is performed. Under the sequence mode, the ADC circuit 104 performs an analog-to-digital conversion to the inner voltage V to generate a digital sequence number Ds, and then the drive circuit 102 receives the digital sequence number Ds and stores the digital sequence number Ds to complete the sequence mode.

After the sequence mode is completed, the drive circuit performs a working mode. Specifically, the drive circuit 102 externally receives a light-emitting command involving a sequence number information and a lighting information generated by the controller 50 through the power wire 100. When the drive circuit 102 determines that the digital sequence number Ds matches with the sequence number information, the drive circuit 102 controls a specific lighting behavior of a light-emitting diode (LED) 101 corresponding to the drive circuit 102 according to the lighting information. Under the working mode, when the drive circuit 102 determines that the stored digital serial number Ds matches with the sequence number information of the received light-emitting command, the drive circuit 102 controls the LED 101 to perform a specific lighting behavior according to the based on the lighting information. The so-called corresponding LED 101 refers to the LED 101 driven and controlled by the corresponding drive circuit 102. Specifically, when the drive circuit 102 determines that the received sequence number information matches with its own, independent digital sequence number Ds, the drive circuit 102 controls the LED 101 to perform the specific lighting behavior according to the lighting information of the received light-emitting command. On the contrary, if the drive circuit 102 determines that the received sequence number information does not match its own digital sequence number Ds, it will not control the corresponding LED 101. As for the lighting control operation, please refer to the previous description and will not be repeated here.

Incidentally, although the LED 101 is shown in the LED circuit 10, it is only for easier explanation of the operational relationship with other circuit components. In fact, the LED 101 is coupled to the LED circuit 10 through an external connection. The number of LEDs 101 may be, for example but not limited to, one (single light), two (red light plus green light), three (three primary color lights), four (three primary colors plus white light), etc., and may be increased or decreased according to actual needs, as shown in FIG. 1A. Each LED 101 includes an anode terminal and a cathode terminal, wherein the anode terminal receives a DC voltage to operate.

As shown in FIG. 1A, the LED circuit with the parallel sequence function 10 further includes a voltage regulation circuit 103 (also called voltage stabilizing circuit). The voltage regulation circuit 103 is coupled to the power wire 100, and receives the inner voltage V and converts the inner voltage V into a supply voltage Vcc with a specific voltage value, such as an operating voltage of 2.5 volts for operating the ADC circuit 104 to maintain the voltage required for normal operation of the ADC circuit 104.

Figure 1B:
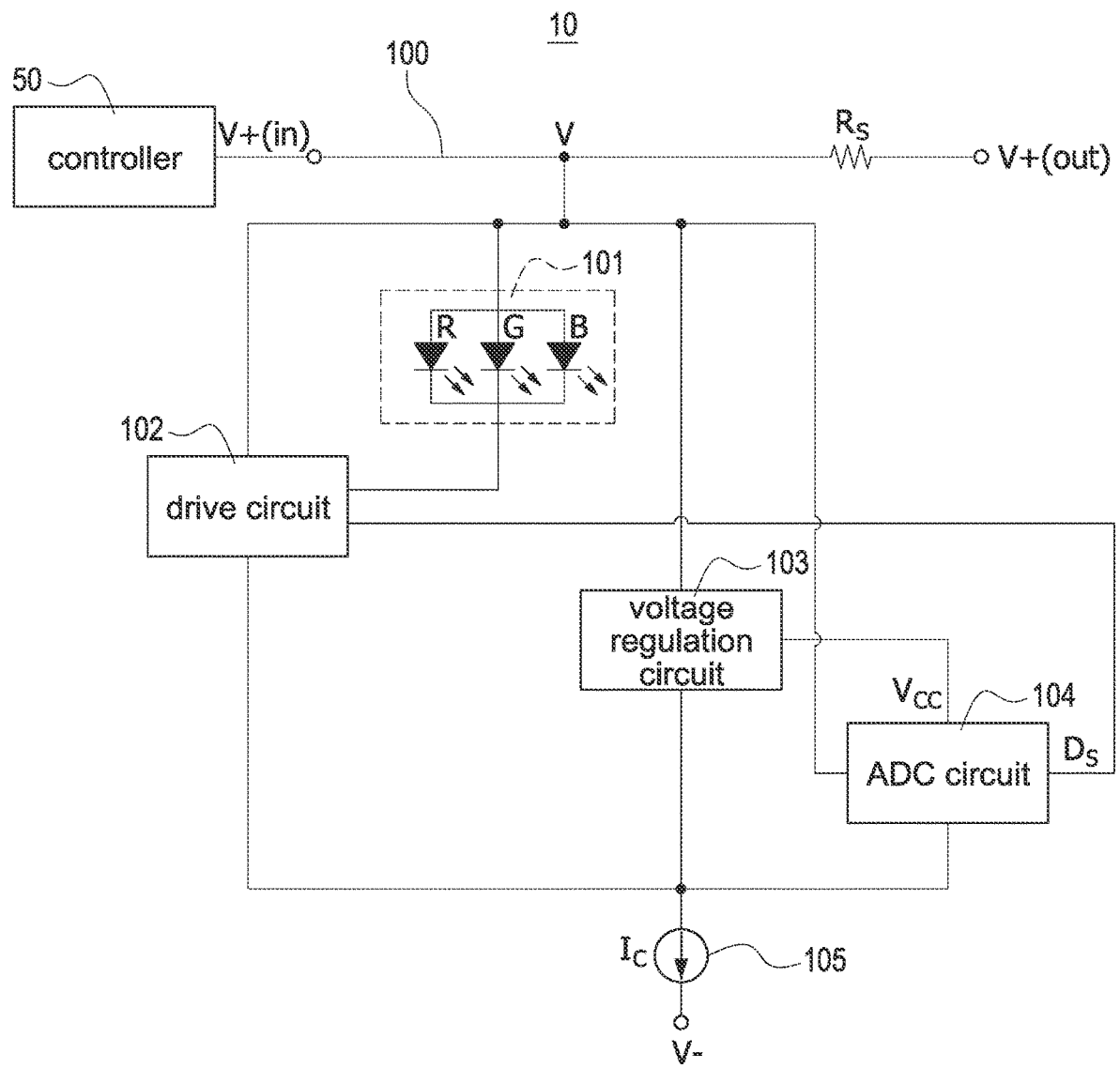
FIG. 1B is a block circuit diagram of the LED circuit with the parallel sequence function according to a second embodiment of the present disclosure.

Please refer to FIG. 1B, which shows a block circuit diagram of the LED circuit with the parallel sequence function according to a second embodiment of the present disclosure. The major difference between the second embodiment shown in FIG. 1B and the first embodiment shown in FIG. 1A is that the position where the inner resistor $R_S$ is connected. As shown in FIG. 1B, the first terminal of the inner resistor $R_S$ is connected to the input terminal V+(in) of the power wire 100, and the second terminal of the inner resistor $R_S$ is connected to the output terminal V+(out) of the power wire 100. In this embodiment, the input terminal V+(in) receives a voltage signal, i.e., an inner voltage V, and a voltage acquired after the inner voltage V passes through the inner resistor $R_S$ (that is, the voltage drop formed by the inner voltage V minus a voltage across the inner resistor $R_S$) is provided at the output terminal V+(out). Since the remaining circuit operations of the second embodiment are similar or identical to those of the first embodiment, they will not be described again here.

Figure 2:
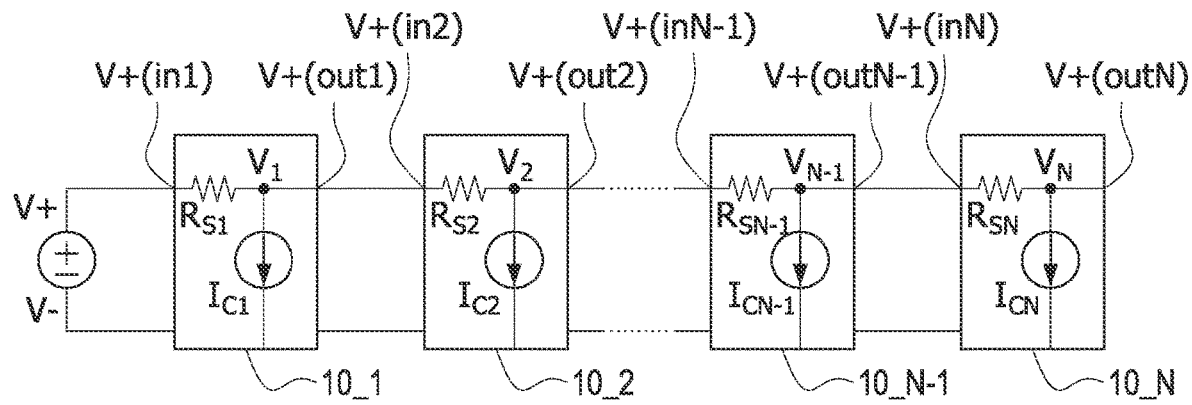
FIG. 2 is a block circuit diagram of a LED light string with a parallel sequence function according to the present disclosure.

Please refer to FIG. 2, which shows a block circuit diagram of a LED light string with a parallel sequence function according to the present disclosure. The LED light string shown in FIG. 2 includes a plurality of LED circuits 10_1 to 10_N shown in FIG. 1A or FIG. 1B. The LED circuits 10_1 to 10_N are electrically connected through the power wire 100 to form a parallel structure, and the LED light string is powered by a voltage signal. In particular, the voltage signal is a direct-current voltage, a pulse voltage, or a carrier voltage, however, this does not limit the present disclosure. As mentioned above, the LED light string includes a plurality of LED circuits 10_1 to 10_N, and therefore each LED circuit 10_1 to 10_N includes an inner resistor, an ADC circuit, a drive circuit, and a current source. Incidentally, each of the LED circuits 10_1 to 10_N shown in FIG. 2 is for simple illustration only and does not represent its complete internal circuit, and the complete internal circuit may be seen in FIG. 1A or FIG. 1B.

Taking FIG. 2 as an example, the LED light string with a parallel sequence function includes a first LED circuit 10_1, a second LED circuit 10_2, . . . and a Nth LED circuit 10_N. The first LED circuit 10_1 mainly includes a first inner resistor $R_{S1}$ and a first current source $I_{C1}$. The second LED circuit 10_2 mainly includes a second inner resistor $R_{S2}$ and a second current source $I_{C2}$. The Nth LED circuit 10_N mainly includes a Nth inner resistor $R_{SN}$ and a Nth current source $I_{CN}$.

The inner resistors $R_{S1}$, $R_{S2}$, $R_{SN}$ are connected between the input terminal and the output terminal of the power wire 100. The input terminal of the first LED circuit of the plurality of LED circuits 10_1 to 10_N (i.e., the first LED circuit 10_1) receives the voltage signal, and the inner voltage V is provided at the first terminal of the inner resistor $R_{S1}$ (see the embodiment shown in FIG. 1B) or the inner voltage Vis provided at the second terminal of the inner resistor $R_{S1}$ (see the embodiment shown in FIG. 1A). Moreover, the input terminal of the non-first LED circuits 10_2 to 10_N (i.e., the second LED circuit 10_2 to the Nth LED circuit 10_N) receives the inner voltage $V_1, V_2, \ldots V_{N-1}$ provided by the previous LED circuits 10_1 to 10_N−1 (see the embodiment shown in FIG. 1A) or receives the voltage acquired after the inner voltage $V_1, V_2, \ldots V_{N-1}$ provided by the previous LED circuits 10_1 to 10_N−1 passes through the inner resistor $R_{S1}, R_{S2}, \ldots R_{SN-1}$ (that is, the inner voltage $V_1, V_2, \ldots V_{N-1}$ minus a voltage across the inner resistor $R_S, R_{S2}, \ldots R_{SN-1}$) (see the embodiment shown in FIG. 1B).

Taking the embodiment of FIG. 1A as an example, the first inner resistor $R_{S1}$ of the first LED circuit 10_1 is connected between the input terminal V+(in1) and the output terminal V+(out1) of the power wire 100, and the first inner resistor $R_{S1}$ receives the voltage signal of 5 volts. After the voltage drop (for example, 0.2 volts) formed by the first inner resistor $R_{S1}$, the first inner voltage $V_1$ is provided at the output terminal V+(out1) to be 4.8 volts. Similarly, the second inner resistor $R_{S2}$ of the second LED circuit 10_2 is connected between the input terminal V+(in2) and the output terminal V+(out2) of the power wire 100, and the second inner resistor $R_{S2}$ receives the inner voltage provided by the previous LED circuit, i.e., the first inner voltage $V_1$ of 4.8 volts provided by the first LED circuit 10_1. After the voltage drop (for example, 0.2 volts) formed by the second inner resistor $R_{S2}$, the second inner voltage $V_2$ is provided at the output terminal V+(out2) to be 4.6 volts. So on and so forth, the Nth inner resistor $R_{SN}$ of the Nth LED circuit 10_N is connected between the input terminal V+(inN) and the output terminal V+(outN) of the power wire 100, and the Nth inner resistor $R_{SN}$ receives the inner voltage provided by the previous LED circuit, i.e., the N−1th inner voltage $V_{N-1}$ of 3.2 volts provided by the N−1th LED circuit 10_N−1. After the voltage drop (for example, 0.2 volts) formed by the Nth inner resistor $R_{SN}$, the Nth inner voltage $V_N$ is provided at the output terminal V+(outN) to be 3.0 volts. That is, the first inner voltage $V_1$ in the first LED circuit 10_1 is greater than the second inner voltage $V_2$ in the second LED circuit 10_2, and so on. In other words, the inner voltage generated by the front (upstream) LED circuit is greater than the inner voltage generated by the rear (downstream) LED circuit, i.e., $V_1 > V_2 > \ldots > V_N$. Accordingly, the LED circuits 10_1 to 10_N are sequenced according to the different sizes of the generated inner voltages $V_1, V_2, \ldots, V_N$.

Therefore, the first ADC circuit receives the first inner voltage $V_1$ and performs the analog-to-digital conversion to the first inner voltage $V_1$ to generate a first digital sequence number. For example, the first inner voltage $V_1$ of 4.8 volts is converted into a digital value of "00111110" through the analog-to-digital conversion, and this digital value is the first digital sequence number. Similarly, the second ADC circuit receives the second inner voltage $V_2$ and performs the analog-to-digital conversion to the second inner voltage $V_2$ to generate a second digital sequence number. For example, the second inner voltage $V_2$ of 4.6 volts is converted into a digital value of "00111101" through the analog-to-digital conversion, and this digital value is the second digital sequence number. So on and so forth, the Nth ADC circuit receives the Nth inner voltage $V_N$ and performs the analog-to-digital conversion to the Nth inner voltage $V_N$ to generate a Nth digital sequence number. For example, the Nth inner voltage $V_N$ of 3.0 volts is converted into a digital value of "00110101" through the analog-to-digital conversion, and this digital value is the Nth digital sequence number. The correspondence between the inner voltage and the digital value (that is, the digital sequence number) is listed below, but this does not limit the present disclosure.

| N  | inner voltage (volts) | digital sequence number |
|----|------------------------|--------------------------|
| 1  | $V_1 = 4.8$           | 00111110                |
| 2  | $V_2 = 4.6$           | 00111101                |
| 3  | $V_3 = 4.4$           | 00111100                |
| 4  | $V_4 = 4.2$           | 00111011                |
| 5  | $V_5 = 4.0$           | 00111010                |
| 6  | $V_6 = 3.8$           | 00111001                |
| 7  | $V_7 = 3.6$           | 00111000                |
| 8  | $V_8 = 3.4$           | 00110111                |
| 9  | $V_9 = 3.2$           | 00110110                |
| 10 | $V_{10} = 3.0$        | 00110101                |

Figure 3:
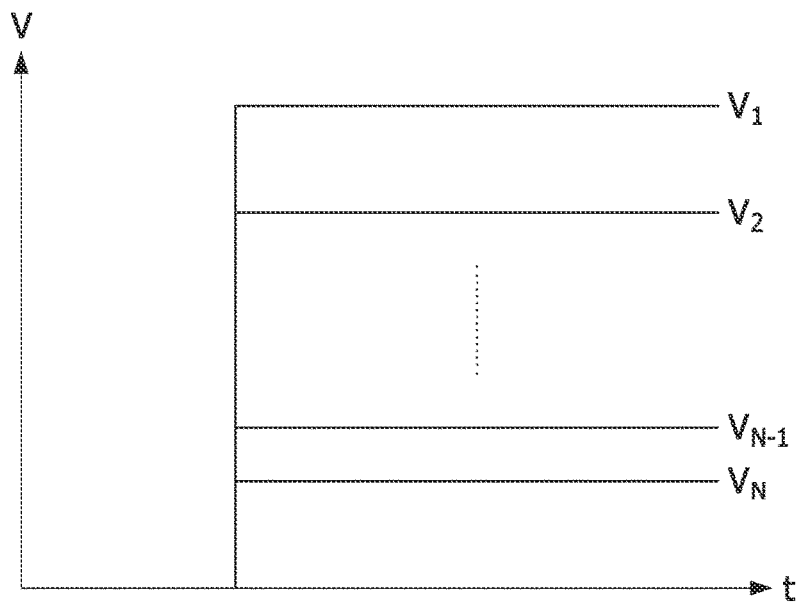
FIG. 3 is a schematic voltage diagram of the LED light string with the parallel sequence function according to the present disclosure.

Please refer to FIG. 3, which shows a schematic voltage diagram of the LED light string with the parallel sequence function according to the present disclosure. Through the cooperation of the voltage drop formed by the inner resistors $R_{S1}, R_{S2}, \ldots R_{SN}$ provided by each LED circuit 10_1 to 10_N and the current source, which makes the inner voltages $V_1, V_2, \ldots V_N$ of each LED circuit 10_1 to 10_N different, that is, the inner voltages $V_1, V_2, \ldots V_N$ are gradually decreased in this embodiment. The present disclosure also uses the characteristics of differences in the inner voltages $V_1, V2, \ldots V_N$ of each LED circuit 10_1 to 10_N as the basis for sequencing the plurality of LED circuits 10_1 to 10_N so that each LED circuit 10_1 to 10_N unique in sequencing, thereby greatly increasing the accuracy of sequencing the plurality of LED circuits 10_1 to 10_N of the LED light string.

Therefore, each drive circuit stores the digital sequence number Ds, that is, the first drive circuit of the first LED circuit 10_1 stores the digital sequence number of "00111110", the second drive circuit of the second LED circuit 10_2 stores the digital sequence number of "00111101", and so on, the Nth drive circuit of the Nth LED circuit 10_N stores the digital sequence number of "00110101". Further, each drive circuit compares the sequence number information of the received light-emitting command with the stored digital sequence number Ds. When the drive circuit 102 determines that the received sequence number information matches with the stored digital sequence number Ds, a specific lighting behavior (such as intermittent flashing, high-frequency flashing, colorful flashing, marquee, etc.) of the LED 101 corresponding to the drive circuit is controlled. For example, it is assumed that the digital sequence number stored in the first drive circuit is "00111110". If the sequence number information received by the first drive circuit is "00111110" and matches with the digital sequence number, the first drive circuit controls the specific lighting behavior of the corresponding LED 101. On the contrary, if the sequence number information received by the first drive circuit is "00111101" and does not match with the digital sequence number, the first drive circuit will not control the specific lighting behavior of the corresponding LED 101. The operations of other drive circuits are the same or similar to those of the first drive circuit, and therefore will not be described again.

Moreover, after each LED circuit 10_1 to 10_N completes storing the digital sequence number according to different positions, the positions of the plurality of LED circuits 10_1 to 10_N of the LED light string can be further confirmed with an external mobile device through a light string controller. The mobile device may be a smartphone, a tablet, a wearable device, etc. The mobile device at least has a photography or camera lens capable of capturing images, referred to as an image capture unit. For example, the light string controller, i.e., the external controller 50, scans the code according to the built-in value range of the digital sequence number (for example, 00000000 to 11111111) to output a carrier light-emitting command, where the light-emitting command includes the sequence number information and the lighting information. When the sequence number information matches with the digital sequence number Ds of the drive circuit, the corresponding LED is controlled to start the lighting process. Simultaneously, the mobile device will record the positions of the LEDs of the LED light string by capturing images, and send the position information to the light string controller so that the light string controller can store it. That is, after the light string controller stores digital sequence numbers and position information of the LED circuits of the LED light string, the LED light string can be completely controlled.

Figure 4:
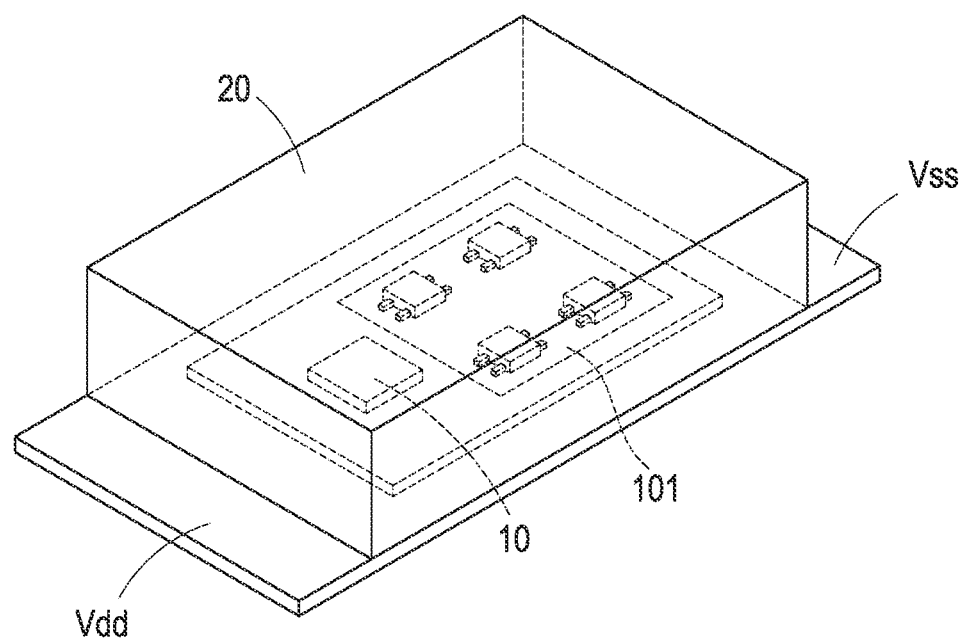
FIG. 4 is a schematic diagram of a packaging structure of a LED circuit package with a parallel sequence function according to the present disclosure.

Please refer to FIG. 4, which shows a schematic diagram of a packaging structure of a LED circuit package with a parallel sequence function according to the present disclosure. The LED circuit package includes two power pins, at least one LED 101, the LED circuit 10, and a package 20. The two power pins are used to receive a voltage signal. The at least one 101 is coupled to the power pins Vdd, Vss. For the specific description of the LED circuit 10, please refer to the previous disclosure and will not be repeated here. The package 20 is used to package the LED circuit 10, the at least one LED 101, and a part of the two power pins, and the other part of the two power pins is exposed outside the package 20.

In summary, the present disclosure has the following features and advantages:
1. The LED light string of the present disclosure does not require the use of additional external resistors, switches or constant current circuits or devices, thereby making the light string structure simple and simplifying circuit design.
2. The LED circuit of the present disclosure arranges the inner resistor and the current source in the control IC so that the LED light string structure is simple and easy to assemble, produce and use.
3. The present disclosure adopts a parallel carrier design, which eliminates the need for additional wires to design signal transmission lines, and the control IC does not require additional contacts to receive specific voltage signals, thereby making the control simple and intuitive.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A light-emitting diode circuit with a parallel sequence function, comprising:
   an inner resistor comprising a first terminal and a second terminal, the first terminal connected to an input terminal of a power wire, and the second terminal connected to an output terminal of the power wire; the input terminal coupled to a controller, and configured to receive a voltage signal generated by the controller; an inner voltage is provided at the first terminal or the second terminal of the inner resistor,
   an analog-to-digital conversion circuit coupled to the power wire, and configured to receive the inner voltage,
   a drive circuit coupled to the power wire and the analog-to-digital conversion circuit, and the drive circuit configured to externally receive the voltage signal, and
   a current source coupled to the drive circuit and the analog-to-digital conversion circuit, and the current source configured to provide a current path of the light-emitting diode circuit,
   wherein when the drive circuit is configured to perform a sequence mode according to a specific signal, the analog-to-digital conversion circuit is configured to perform an analog-to-digital conversion to the inner voltage to generate a digital sequence number, and then the drive circuit is configured to store the digital sequence number.

2. The light-emitting diode circuit as claimed in claim 1, wherein after the sequence mode is completed, the drive circuit is configured to perform a working mode; the drive circuit externally receives a light-emitting command comprising a sequence number information and a lighting information generated by the controller through the power wire; when the drive circuit determines that the digital sequence number matches with the sequence number information, the drive circuit is configured to control a specific lighting behavior of a light-emitting diode corresponding to the drive circuit according to the lighting information.

3. The light-emitting diode circuit as claimed in claim 1, further comprising:
   a voltage regulation circuit coupled to the power wire, and configured to receive the inner voltage and convert the inner voltage into a supply voltage with a specific voltage value for operating the analog-to-digital conversion circuit.

4. The light-emitting diode circuit as claimed in claim 1, wherein the voltage signal is a direct-current voltage, a pulse voltage, or a carrier voltage.

5. The light-emitting diode circuit as claimed in claim 2, wherein the sequence number information and the lighting information are respectively digital values with a plurality of bits.

6. The light-emitting diode circuit as claimed in claim 5, wherein the lighting information is continued with the sequence number information to form the light-emitting command, or the sequence number information is continued with the lighting information to form the light-emitting command.

7. The light-emitting diode circuit as claimed in claim 1, wherein the inner voltage is provided for an operation of the drive circuit.

8. The light-emitting diode circuit as claimed in claim 1, wherein the controller is configured to generate the specific signal, and the specific signal is received by the power wire; the specific signal is a specific code.

9. A light-emitting diode circuit package with a parallel sequence function, comprising:
   two power pins configured to receive a voltage signal,
   at least one light-emitting diode coupled to the two power pins,
   a light-emitting diode circuit coupled to the two power pins and the at least one light-emitting diode, and the light-emitting diode circuit being supplied power by the voltage signal, the light-emitting diode circuit comprising:

an analog-to-digital conversion circuit, and a drive circuit coupled to the analog-to-digital conversion circuit; wherein when the drive circuit is configured to perform a sequence mode according to a specific signal, the analog-to-digital conversion circuit is configured to perform an analog-to-digital conversion to an inner voltage to generate a digital sequence number, and then the drive circuit is configured to store the digital sequence number, and a package configured to package the light-emitting diode circuit, the at least one light-emitting diode, and a part of the two power pins, wherein each power pin is partially exposed outside the package.

10. A light-emitting diode light string with a parallel sequence function, comprising:

a plurality of light-emitting diode circuits electrically connected to form a parallel-connected structure through a power wire, each light-emitting diode circuit comprising:

an inner resistor comprising a first terminal and a second terminal, the first terminal connected to an input terminal of the power wire, and the second terminal connected to an output terminal of the power wire; the input terminal of a first light-emitting diode circuit of the plurality of light-emitting diode circuits coupled to a controller, and configured to receive a voltage signal generated by the controller; an inner voltage is provided at the first terminal or the second terminal of the inner resistor; the input terminal of non-first light-emitting diode circuits of the plurality of light-emitting diode circuits configured to receive the inner voltage provided the previous light-emitting diode circuit or receive a voltage acquired after the inner voltage provided by the previous light-emitting diode circuit minus a voltage across the inner resistor, an analog-to-digital conversion circuit coupled to the power wire, and configured to receive the inner voltage, a drive circuit coupled to the power wire and the analog-to-digital conversion circuit, and the drive circuit configured to externally receive the voltage signal, and a current source coupled to the drive circuit and the analog-to-digital conversion circuit, and the current source configured to provide a current path of the light-emitting diode circuit, wherein the inner resistors of the light-emitting diode circuits are connected in series through the power wire, wherein when each of the drive circuits is configured to perform a sequence mode according to a specific signal, each of the analog-to-digital conversion circuits is configured to perform an analog-to-digital conversion to the inner voltage to generate a digital sequence number, and then each of the drive circuits is configured to store the digital sequence number.

11. The light-emitting diode light string as claimed in claim 10, wherein after the sequence mode is completed, each of the drive circuits is configured to perform a working mode; each of the drive circuits externally receives a light-emitting command comprising a sequence number information and a lighting information generated by the controller through the power wire; when each of the drive circuits determines that the digital sequence number matches with the sequence number information, each of the drive circuits is configured to control a specific lighting behavior of a light-emitting diode corresponding to the drive circuit according to the lighting information.

12. The light-emitting diode light string as claimed in claim 10, wherein each of the light-emitting diode circuits further comprises:

a voltage regulation circuit coupled to the power wire, and configured to receive the inner voltage and convert the inner voltage into a supply voltage with a specific voltage value for operating the analog-to-digital conversion circuit.

13. The light-emitting diode light string as claimed in claim 10, wherein the voltage signal is a direct-current voltage, a pulse voltage, or a carrier voltage.

14. The light-emitting diode light string as claimed in claim 11, wherein the sequence number information and the lighting information are respectively digital values with a plurality of bits.

15. The light-emitting diode light string as claimed in claim 14, wherein the lighting information is continued with the sequence number information to form the light-emitting command, or the sequence number information is continued with the lighting information to form the light-emitting command.

16. The light-emitting diode light string as claimed in claim 10, wherein the inner voltage is provided for an operation of the drive circuit.

17. The light-emitting diode light string as claimed in claim 10, wherein the controller is configured to generate the specific signal, and the specific signal is received by the power wire; the specific signal is a specific code.

18. The light-emitting diode light string as claimed in claim 10, wherein the inner voltage of the light-emitting diode circuit whose electrical connection position is close to the input terminal is greater than the inner voltage of the light-emitting diode circuit whose electrical connection position is far from the input terminal.

* * * * *